United States Patent [19]
Allen, III et al.

[11] Patent Number: 5,863,018
[45] Date of Patent: Jan. 26, 1999

[54] BAR FEEDER SUPPORT

[75] Inventors: Clifford W. Allen, III, Lexington; Theodore P. O'Canna, Versailles; Marshall B. Reynolds, Jr., Lexington, all of Ky.

[73] Assignee: Lexair, Inc., Lexington, Ky.

[21] Appl. No.: 705,639

[22] Filed: Aug. 30, 1996

[51] Int. Cl.⁶ ................................................. F16M 11/00
[52] U.S. Cl. ................................... 248/176.1; 248/278.1; 414/17; 414/18
[58] Field of Search .............................. 248/176.1, 278.1, 248/288.31; 269/75, 287, 296, 45; 414/17, 18, 746.3, 16, 14

[56] References Cited

U.S. PATENT DOCUMENTS

| | | | |
|---|---|---|---|
| 2,339,712 | 1/1944 | Mariotte | 414/17 |
| 2,602,212 | 7/1952 | Rosenberg | 414/18 |
| 2,931,256 | 4/1960 | Peterson | 80/53 |
| 3,074,566 | 1/1963 | MacBlane, Sr. | 414/17 |
| 3,627,339 | 12/1971 | Burweger | 269/287 |
| 3,815,892 | 6/1974 | Tulk | 269/75 |
| 3,937,451 | 2/1976 | DiPaola et al. | 269/45 |
| 3,977,645 | 8/1976 | Deely | 248/278.1 |
| 4,129,270 | 12/1978 | Peterson et al. | 414/18 |
| 4,217,800 | 8/1980 | Furegati | 82/2.5 |
| 4,423,993 | 1/1984 | Eaton | 414/17 |
| 4,807,861 | 2/1989 | Kimball | 269/75 |
| 5,048,383 | 9/1991 | Geiser et al. | 82/127 |
| 5,660,363 | 8/1997 | Maglica | 248/288.31 |

FOREIGN PATENT DOCUMENTS

252 403   9/1948   Switzerland ............................ 269/75

*Primary Examiner*—Ramon O. Ramirez
*Assistant Examiner*—Kimberly T. Wood
*Attorney, Agent, or Firm*—Frank C. Leach, Jr.

[57] ABSTRACT

A bar feeder support has two longitudinally spaced swivel mounts for supporting longitudinally spaced portions of a cylindrical body for both sliding and swivel movement. The cylindrical body supports a feed tube for feeding a bar stock to a lathe. The front swivel mount, which is closest to the lathe, also has a clamp arrangement for clamping the cylindrical body against movement. The swivel mounts allow the cylindrical body to swivel sufficiently to slide from a position in which its longitudinal axis is aligned with an axis of a spindle of the lathe and an access position in which a new bar stock may be disposed in the feed tube, the feed tube may be removed from the cylindrical body, and another feed tube may be loaded into the cylindrical body.

30 Claims, 10 Drawing Sheets

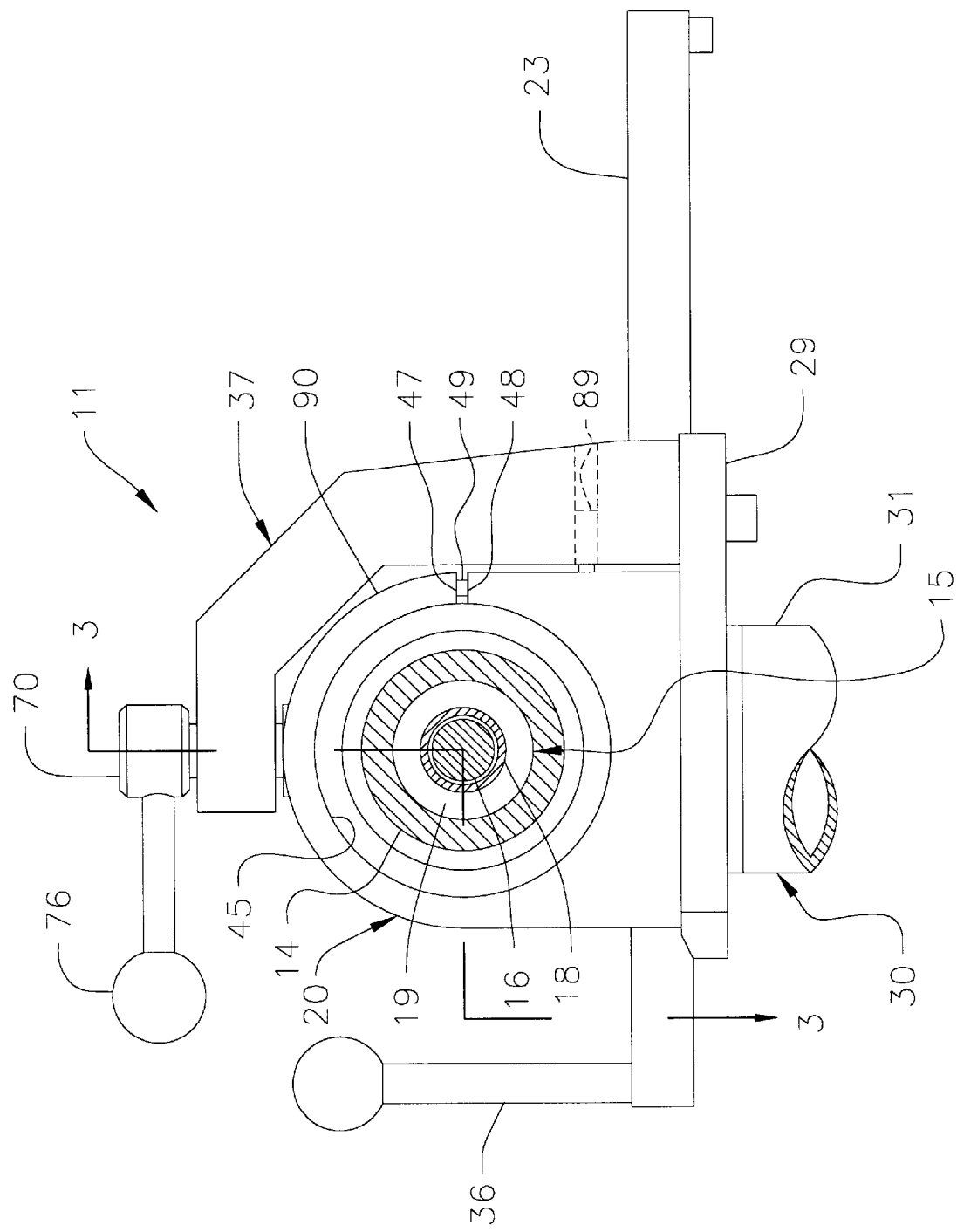

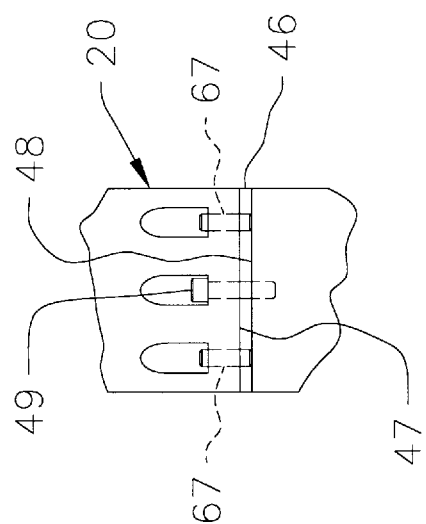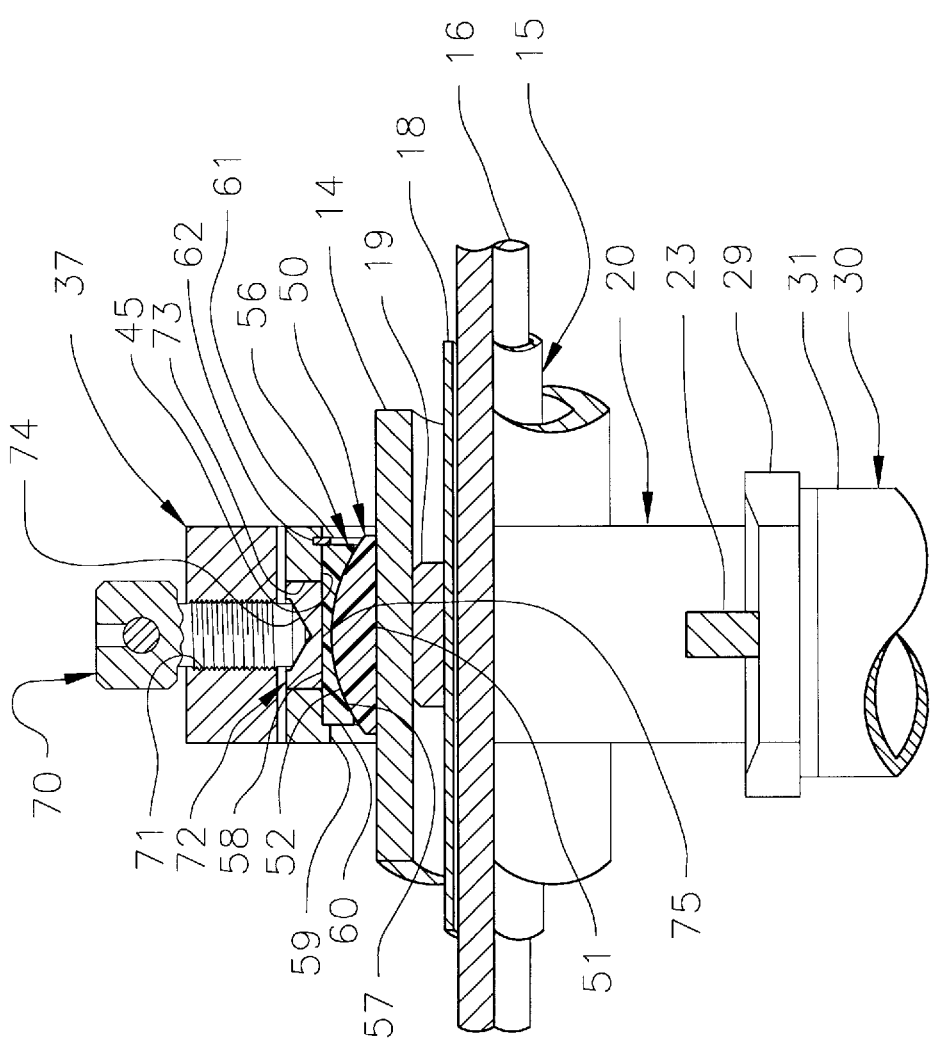

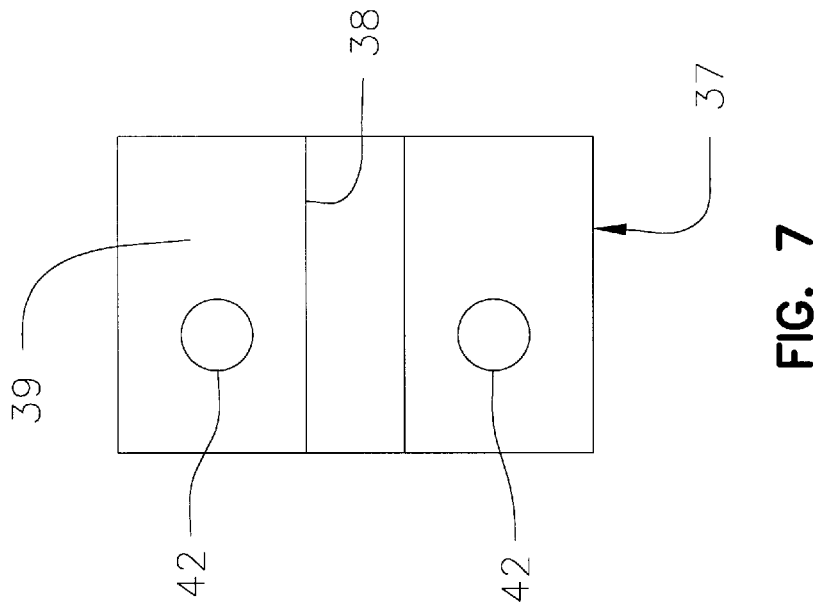
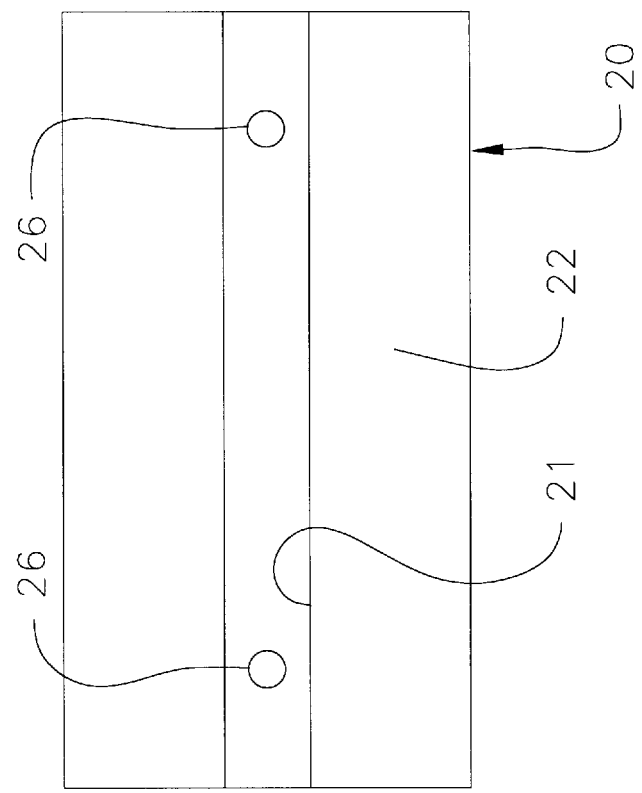

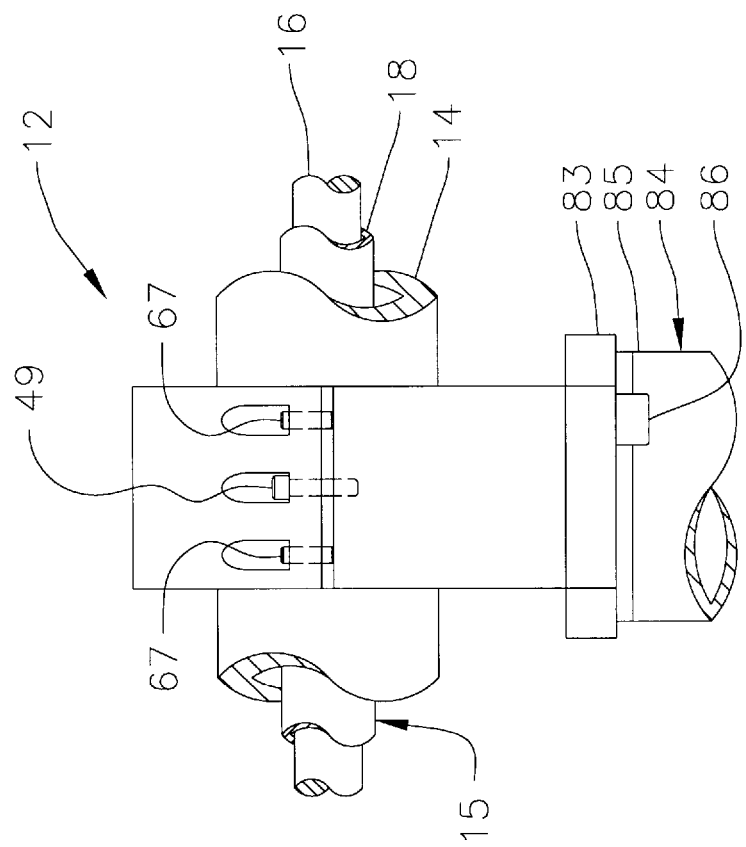
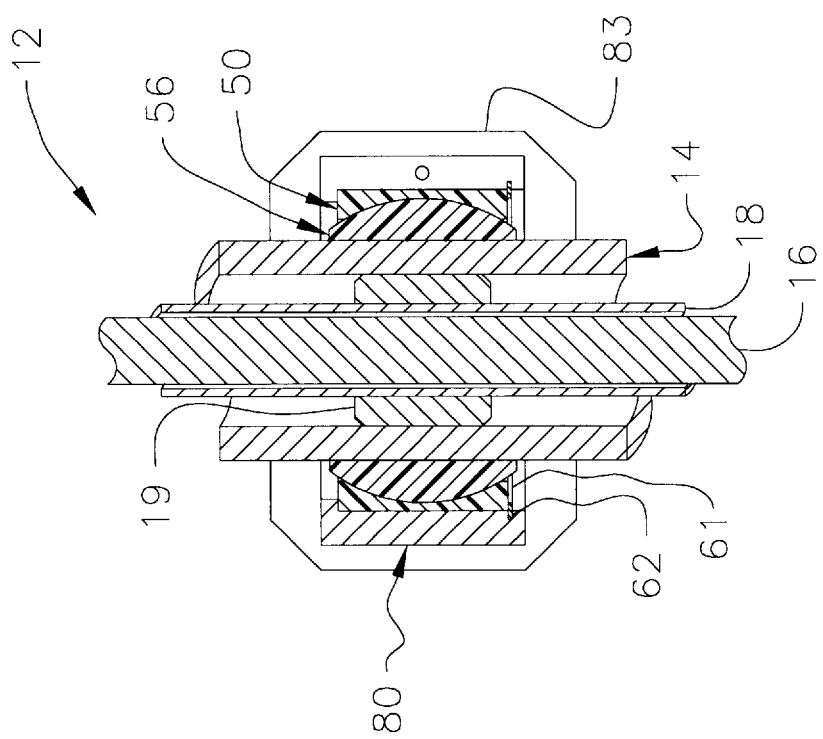
FIG. 10
FIG. 9

BAR FEEDER SUPPORT

This invention relates to a bar feeder and, more particularly, to an improved bar feeder support for a cylindrical body supporting at least one feed tube for supporting a bar stock.

A hydrodynamic bar feeder has a cylindrical body supporting at least one feed tube therein in which the feed tube supports a bar stock for feeding to a lathe. Since the bar stock must have its longitudinal axis aligned with the axis of a spindle of a lathe to which the bar stock is fed by the bar feeder, both the feed tube and the cylindrical body must have their longitudinal axes aligned with the axis of the spindle of the lathe when there is only one feed tube in the cylindrical body.

The cylindrical body, which is hollow and open at one end, is normally supported by being disposed within two longitudinally spaced clamps. One example of this type of a hydrodynamic bar feeder is sold by Lexair, Inc., Lexington, Ky. as model RB 2.75.

In the previously mentioned Lexair hydrodynamic bar feeder, the rear clamp, which is remote from the lathe, is pivotally supported so that when the front clamp, which is closest to the lathe, is released from retaining means, the cylindrical body can be pivoted about the pivot of the rear clamp to an access position in which there is access to the open end of the cylindrical body. This allows a new bar stock to be loaded in the feed tube within the cylindrical body or the feed tube to be removed and a new feed tube inserted in the cylindrical body to replace the removed feed tube. This requires the front clamp and its support to move along an arc with the pivot of the rear clamp as its center.

The longitudinal axis of the cylindrical body must be aligned with the axis of the spindle of the lathe at the time of initial installation of the hydrodynamic bar feeder. This requires that two support plates, which support the two clamps and are mounted on pedestals, be in the same plane and parallel to the plane of the longitudinal axis of the cylindrical body. This is a time consuming effort.

If the two support plates are tilted perpendicular to the longitudinal axis of the cylindrical body in opposite directions, for example, the cylindrical body cannot be pivoted to its access position. If the two support plates are tilted fore and aft along the longitudinal axis of the cylindrical body, the longitudinal axis of the cylindrical body cannot be aligned with the axis of the spindle of the lathe.

The bar feeder support of the present invention is an improvement of the previously discussed Lexair bar feeder in that it is not necessary to expend the time to have supports for the two clamps precisely in the same plane. This is avoided through replacing the two clamps with a combined swivel and clamping arrangement at the front support and a swivel arrangement at the rear support.

That is, the bar feeder support of the present invention has a swivel mount or bearing, which enables easier alignment of the axis of the cylindrical body with the axis of the spindle of the lathe, at both the front and rear supports. It is not necessary to have the precise alignment of the supports of the swivel mounts as with the previously discussed Lexair bar feeder. This is because the inner element of each of the swivel mounts or bearings can swivel relative to its outer element, which is supported so as to not move, to compensate for any slight misalignment of the longitudinal axis of the cylindrical body and the axis of the spindle of the lathe due to two pedestal support plates for the two swivel mounts not being in the same plane.

Additionally, the use of the swivel mounts at the two supports also allows sliding of the cylindrical body relative thereto to different longitudinal positions. This is not possible with the previously discussed Lexair bar feeder.

Furthermore, the swivel mounts of the present invention eliminate the requirement for the rear support to pivot about a vertical axis so that the cylindrical body can be pivoted to its access position. Instead, it is only necessary to slide, not pivot, the front swivel mount or support to position the cylindrical body so that a new bar stock may be loaded in the feed tube within the cylindrical body or a new feed tube may replace the feed tube within the cylindrical body before a new bar stock is loaded.

Because of the lighter weight of the swivel mounts, the present invention also reduces the number of support columns in each of the pedestals from two to one. This allows the size of the pedestals to be decreased. This produces a bar feeder having a lower cost and a smaller size.

An object of this invention is to provide an improved bar feeder support.

Another object of this invention is to reduce the overall cost and size of a bar feeder.

Other objects of this invention will be readily perceived from the following description, claims, and drawings.

This invention relates to a bar feeder support for supporting a cylindrical body supporting at least one feed tube in which a bar stock is to be supported for feeding to a lathe. The bar feeder support includes first and second support means for supporting the cylindrical body at longitudinally spaced portions of the cylindrical body. Each of the first and second support means includes swivel means supporting for the cylindrical body for both sliding and swivel motion and supporting means for supporting the swivel means. The first support means also has clamping means for cooperating with the swivel means of the first support means for clamping a portion of the cylindrical body at a desired longitudinal position to prevent motion of the cylindrical body. At least one of the swivel means of the first support means and the second support means has both sliding and swivel motions of the cylindrical body simultaneously when the clamping means is released to enable movement of the swivel means of the first support means relative to the supporting means for supporting the swivel means of the first support means.

The attached drawings illustrate a preferred embodiment of the invention, in which:

FIG. 2 is an elevational view of a front support and looking from the front;

FIG. 3 is a sectional view of the front support of FIG. 2 taken along line 3—3 of FIG. 2;

FIG. 4 is a fragmentary elevational view of a portion of a housing of the front support and showing its free end surfaces connected to each other;

FIG. 6 is a bottom plan view of a bottom surface of a housing of the front support;

FIG. 7 is a bottom plan view of a bottom surface of a clamping arm of the front support;

FIG. 9 is a sectional view of the rear support of FIG. 8 taken along 9—9 of FIG. 8;

FIG. 10 is a side elevational view of the rear support of FIG. 8 taken along line 10—10 of FIG. 8;

Figure 12:
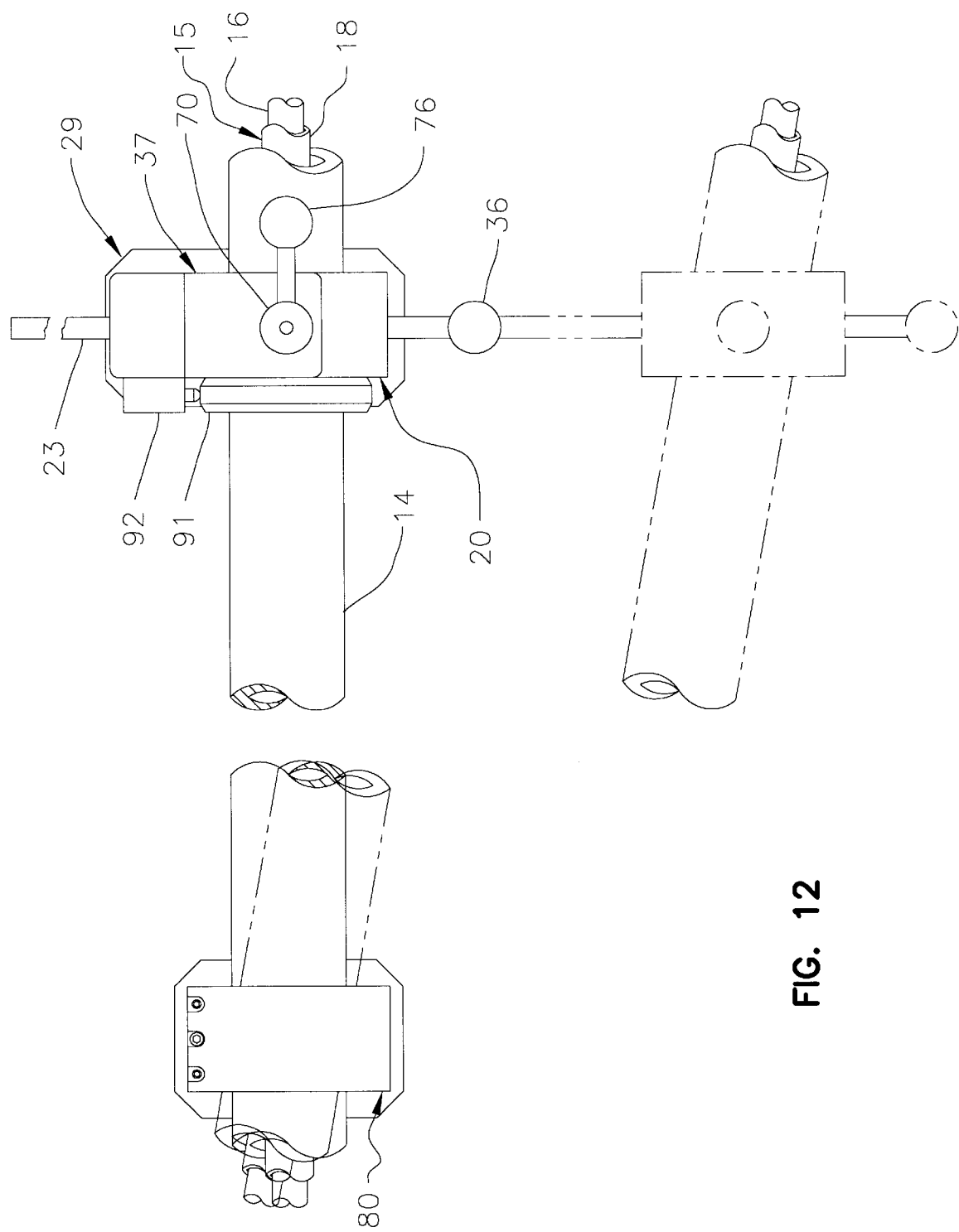
Figure 13:
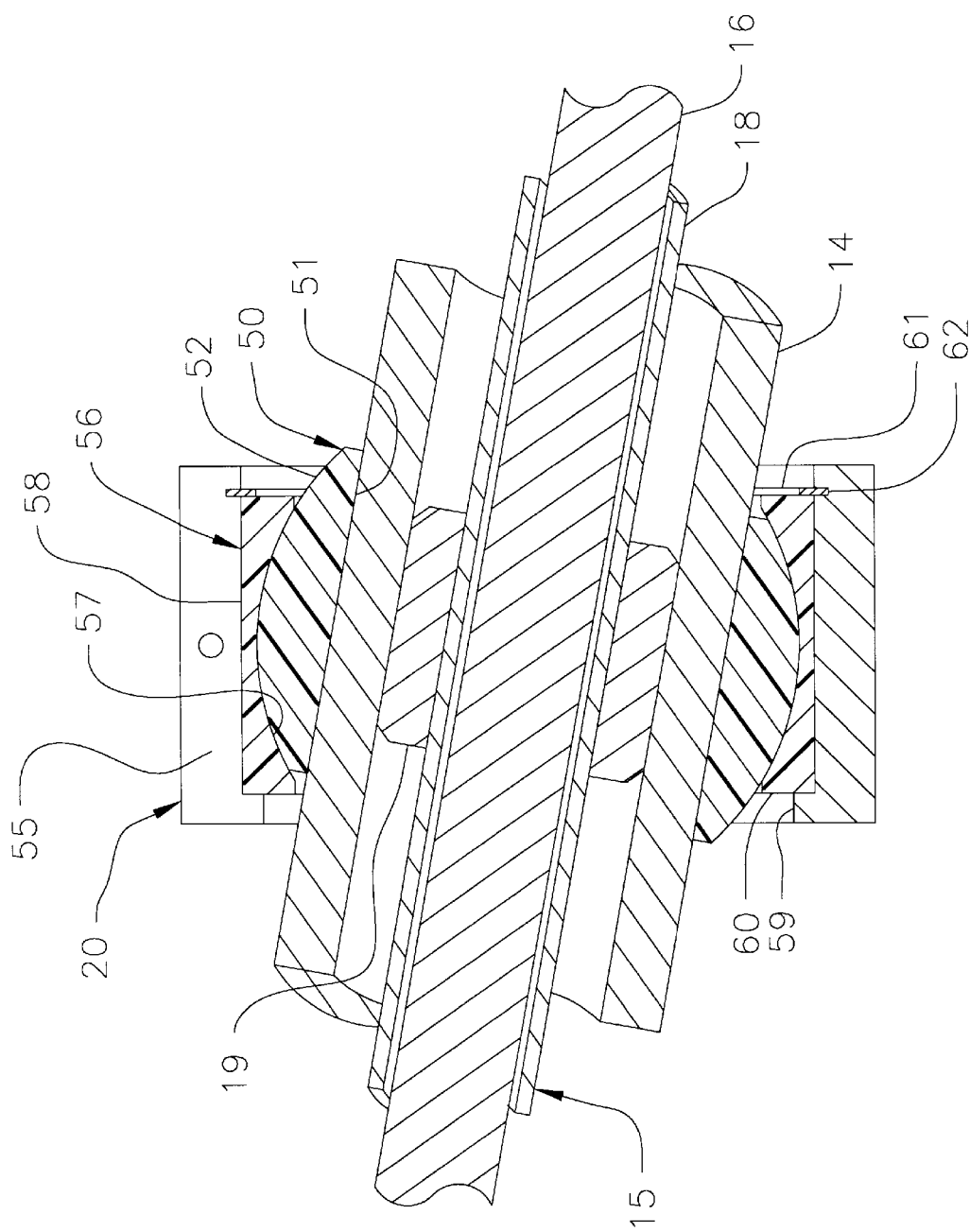

FIG. 12 is a fragmentary top plan view of the front and rear supports and a cylindrical body supported thereby with a solid line position showing the cylindrical body when it is disposed in its aligned position in which its longitudinal axis is in alignment with the axis of a spindle of a lathe and a phantom line position showing the cylindrical body when it is in its access position to have a bar stock loaded within a feed tube in the cylindrical body or a feed tube replaced; and FIG. 13 is an enlarged sectional view of the front support of FIG. 12 with the cylindrical body in its access position as shown in phantom in FIG. 12.

Figure 1:
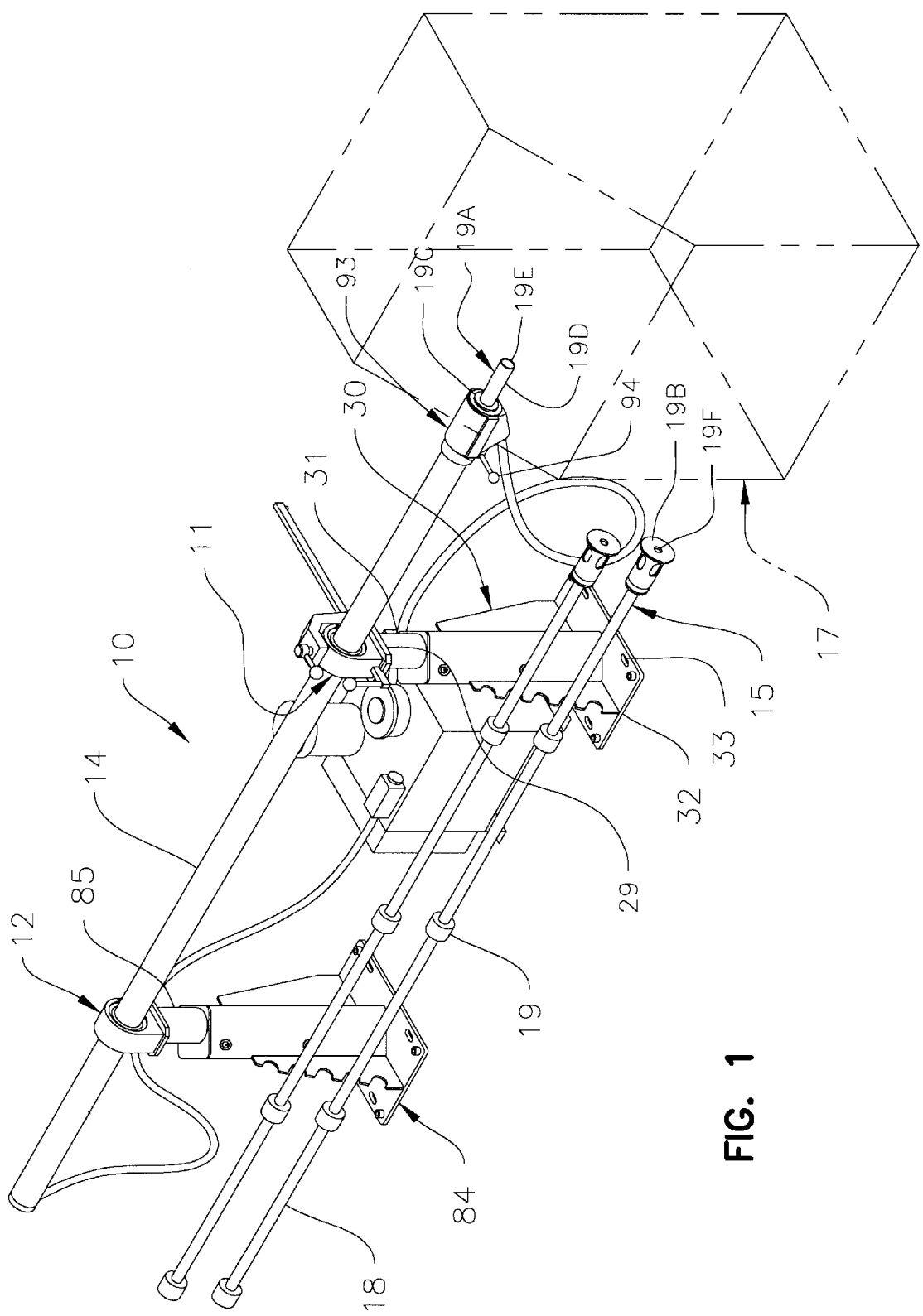
FIG. 1 is a perspective view of a bar feeder of the present invention without a bar stock and showing a lathe with which the bar feeder is used in phantom.

Referring to the drawings and particularly FIG. 1, there is shown a hydrodynamic bar feeder 10. The bar feeder 10 includes a front support 11 and a rear support 12, which is longitudinally spaced from the front support 11, for supporting a cylindrical body 14.

The cylindrical body 14, which is hollow, is open at one end to receive a feed tube 15. The feed tube 15 feeds a bar stock 16 (see FIG. 2) to a lathe 17 (see FIG. 1), which is shown in phantom. The lathe 17 may be either a fixed head lathe or a sliding headstock lathe (also known as a Swiss style screw machine), for example. Both of the lathes are automatic lathes.

Each of the feed tubes 15 is a different diameter in accordance with the size of the bar stock 16 (see FIG. 2) to be used therewith. Each of the feed tubes 15 (see FIG. 1) includes a hollow cylindrical rod 18 having a plurality of longitudinally spaced bushings 19 thereon. The bushings 19 of each of the feed tubes 15 have the same outer diameter irrespective of the diameter of the cylindrical rod 18 so that they will always be supported by the cylindrical body 14.

While the cylindrical body 14 of the hydrodynamic bar feeder 10 has only one of the feed tubes 15 therein, it should be understood that the cylindrical body 14 could have a plurality of the feed tubes 15 supported therein, if desired. One suitable example of a multi-tube arrangement is shown in U.S. Pat. No. 5,048,383 to Geiser et al. Of course, this arrangement requires alignment of the cylindrical body 14 along a longitudinal axis of the feed tube 15 at the position at which the bar stock 16 is fed to the lathe 17 rather than along the longitudinal axis of the center of the cylindrical body 14.

Each of the feed tubes 15 has a guard 19A attached to its front end face 19B by a base 19C. The guard 19A has an extension 19D with a passage 19E extending therethrough to receive the bar stock 16 (see FIG. 2) when it is loaded into the feed tube 15 (see FIG. 1). The passage 19E communicates with a passage 19F in the feed tube 15.

The guard 19A primarily prevents a user from grabbing the bar stock 16 (see FIG. 2) during its rotation. When the bar stock 16 is relatively small, the extension 19D (see FIG. 1) of the guard 19A also functions as a support.

The front support 11 includes a housing 20 (see FIG. 5) having a longitudinal slot 21 in its bottom surface 22. The longitudinal slot 21 slidably receives a slide bar 23. The slide bar 23 is attached to the housing 20 by a pair of screws 24 extending through a pair of passages 25 in the slide bar 23 and into a pair of tapped holes 26 (see FIG. 6) in the bottom surface 22 of the housing 20.

The slide bar 23 (see FIG. 5) is disposed within a longitudinal slot 27 in a top surface 28 of a top plate 29 of a front pedestal 30 (see FIG. 1). The top plate 29 is attached to a column 31 of the front pedestal 30. The column 31 may be vertically held in any position within the front pedestal 30 by suitable retaining means such as a jackscrew, for example.

The front pedestal 30 has a flat base 32 for support by a floor or other suitable support surface. The flat base 32 has elongated slots 33 near its four corners.

The elongated slots 33 enable shifting of the position of the front pedestal 30 substantially perpendicular to the longitudinal axis of the cylindrical body 14. This adjustment is utilized during installation of the bar feeder 10. The top plate 29 (see FIG. 5) is fixed to the top of the column 31 (see FIG. 1) by a flat head screw 34 (see FIG. 5) extending through a passage 35 in the top plate 29 into the column 31 (see FIG. 1).

In addition to supporting the sliding bar 23 (see FIG. 5), which has a handle 36 on one end, the top plate 29 also supports a clamping arm 37. The clamping arm 37 has a longitudinal slot 38 formed in its bottom surface 39 to enable the slide bar 23 to pass therethrough.

The clamping arm 37 is releasably fixed to the top plate 29 through screws 40 extending through elongated slots 41 in the top plate 29 and into threaded holes 42 (see FIG. 7) in the bottom surface 39 of the clamping arm 37. This enables fine adjustment of the clamping arm 37 relative to the housing 20 (see FIG. 5).

The housing 20 has a cylindrical passage 45 of circular cross section extending therethrough. The housing 20 has a cutout 46 on one side so that the passage 45 is not continuous.

The cutout 46 produces two free end surfaces 47 (see FIG. 4) and 48, which are substantially parallel to each other. A bolt 49 secures the two free end surfaces 47 and 48 to each other but in spaced relation.

A first or inner element 50 (see FIG. 5) is positioned within the passage 45 in surrounding relation to the cylindrical body 14 as shown in FIG. 3. The first element 50, which must be flexible, is preferably formed of a suitable plastic such as DELRIN, for example.

The first element 50 has its inner surface 51 formed in a cylindrical, circular shape for cooperation with the outer surface of the cylindrical body 14 to support the cylindrical body 14 for sliding in addition to clamping the cylindrical body 14. The first element 50 has its outer surface 52 formed as a portion of a sphere.

Figure 5:
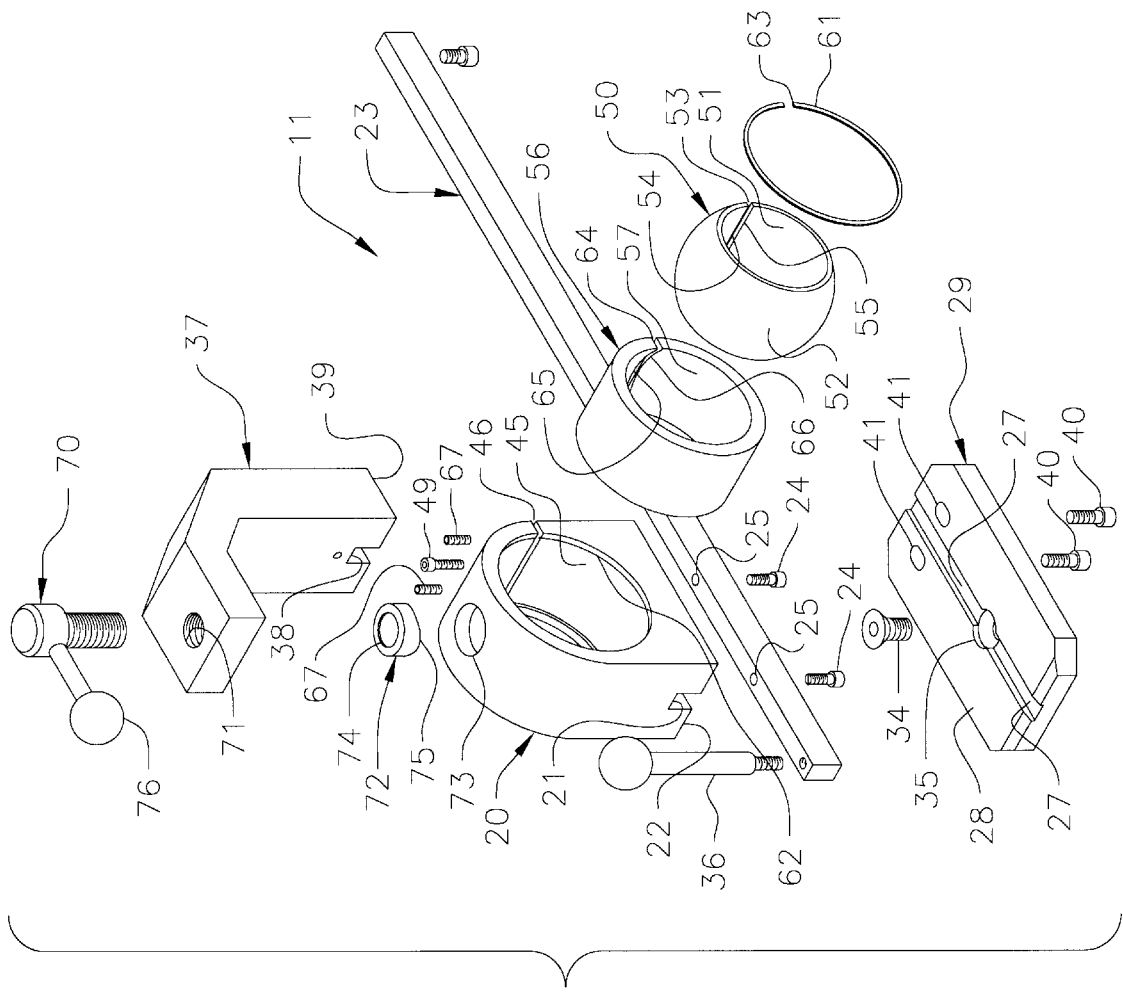
FIG. 5 is an exploded perspective view of the front support of FIG. 2.

As shown in FIG. 5, the first element 50 has a cutout 53 forming two free end surfaces 54 and 55, which are substantially parallel to each other, so that the first element 50 is not continuous. Because the first element 50 is formed of a flexible material, the cutout 53 enables the free end surfaces 54 and 55 to be moved towards each other when a force is applied to the spherical outer surface 52.

The first element 50 is disposed within a second or outer element 56, which has an inner surface 57 (see FIG. 3) formed on a spherical radius slightly larger than the radius of the spherical outer surface 52 of the first element 50 such as a maximum of 0.005", difference. The cooperating spherical surfaces 52 and 57 enable the first element 50 to swivel within the second element 56. The second element 56, which is formed of the same material as the first element 50, has its outer surface 58 formed as a cylinder of circular cross section for cooperation with the wall of the passage 45.

The housing 20 has a shoulder 59 at one end of the passage 45 to reduce the diameter of the passage 45. As a result, an end surface 60 of the second element 56 abuts the shoulder 59 to limit the movement of the second element 56 into the passage 45.

The end surface 60 of the second element 56 is held against the shoulder 59 of the housing 20 by a retaining snap ring 61. The retaining snap ring 61 fits within a groove 62 in the housing 20. This retains both the first element 50 and the second element 56 within the housing 20 while insuring that the second element 56 is stationary.

Because of the cooperating spherical surfaces 52 and 57, the first element 50 swivels with respect to the second element 56. Thus, the cylindrical body 14 has a swivel motion with respect to the front housing 20.

The retaining snap ring 61 (see FIG. 5) has a cutout 63 so that it is not continuous. Likewise, the second element 56 has a cutout 64 so that it also is not continuous. The cutout 64 of the second element 56 provides adjacent, spaced free end surfaces 65 and 66, which are substantially parallel to each other.

As shown in FIG. 4, a pair of set screws 67 is supported in the housing 20 and extends from the end surface 47 of the housing 20. The set screws 67 act against the end surface 48 of the housing 20 to control the tolerance relation between the outer surface of the cylindrical body 14 (see FIG. 3) and the inner surface 51 of the first element 50. This insures that the cylindrical body 14 can slide relative to the first element 50 when no clamping force is applied to the second element 56 through a clamping screw 70.

The clamping screw 70 is threaded through a tapped hole 71 in the clamping arm 37 and has its chamfered bottom end acting against a clamping disk 72, which is preferably formed of 660 bronze. The clamping disk 72, which is disposed within a circular passage 73 in the housing 20, has an outer surface 74 against which the clamping screw 70 engages.

The outer surface 74 of the clamping disk 72 is formed with inclined portions to cooperate with the chamfered bottom end of the clamping screw 70. The clamping disk 72, which is continuous, has its inner surface 75 of a circular shape to act against the cylindrical, circular surface 58 of the second element 56.

Accordingly, when the clamping screw 70 is turned by a handle 76 (see FIG. 2), which is attached to the clamping screw 70, a clamping force is exerted on the cylindrical body 14 at the front support 11. This clamping force moves the free end surfaces 54 (see FIG. 5) and 55 of the first element 50 towards each other to clamp the inner surface 51 of the first element 50 against the cylindrical body 14 (see FIG. 3).

Figure 11:
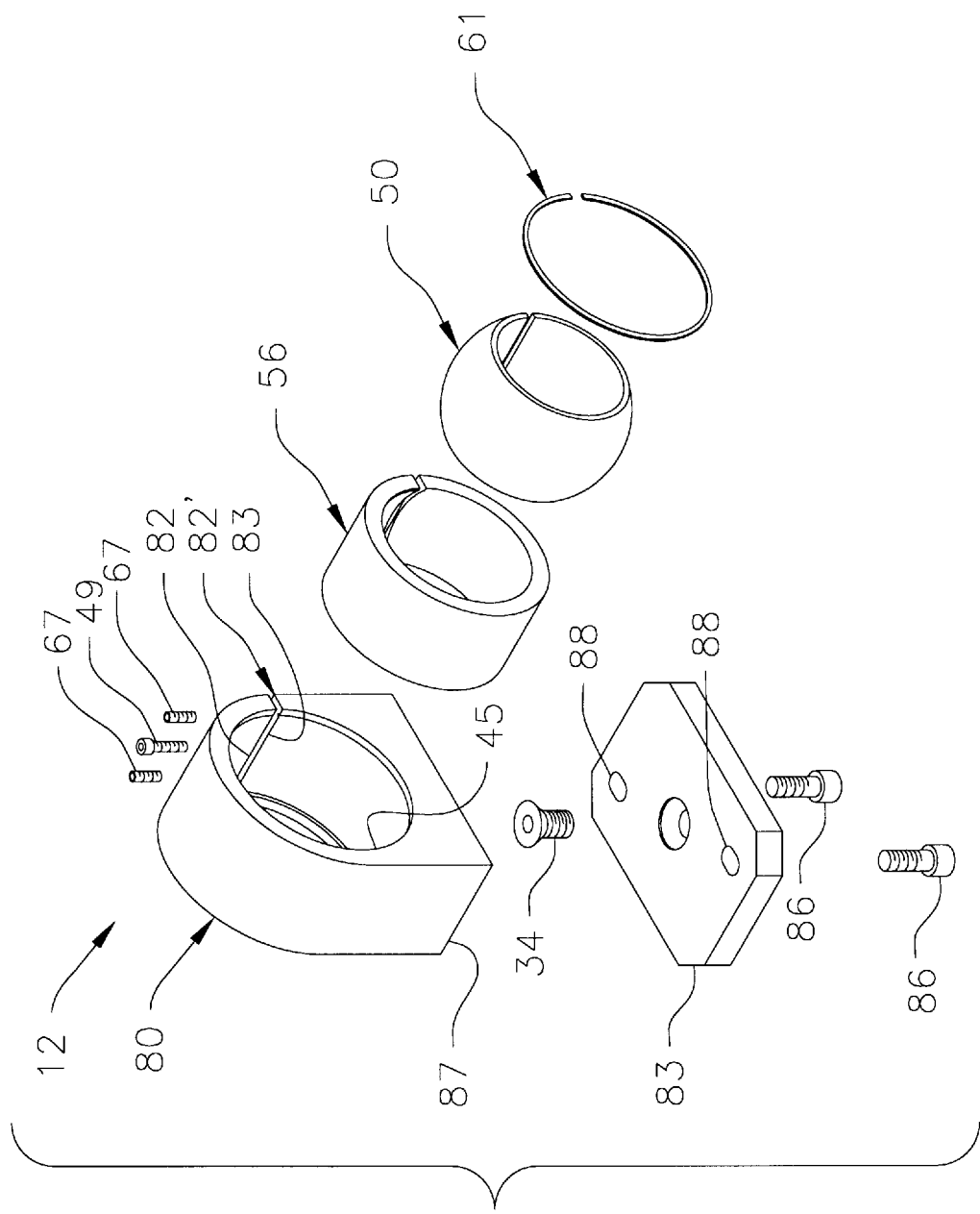
FIG. 11 is an exploded perspective view of the rear support of FIG. 8.

The rear support 12 (see FIG. 1) includes a housing 80 (see FIG. 11), which is the same as the housing 20 (see FIG. 5) except that the housing 80 (see FIG. 11) does not have the passage 73 (see FIG. 5) therein since the housing 80 (see FIG. 9) is not used as a clamp support but only as a swivel and a sliding support for the cylindrical body 14. The longitudinal slot 21 (see FIG. 5) in the bottom surface 22 of the housing 20 also is not formed in the housing 80 (see FIG. 11) because the housing 80 is not movable. The housing 80 includes one of the first elements 50, one of the second elements 56, and one of the retaining snap rings 61 to form the swivel mount or bearing at the rear support 12.

Figure 8:
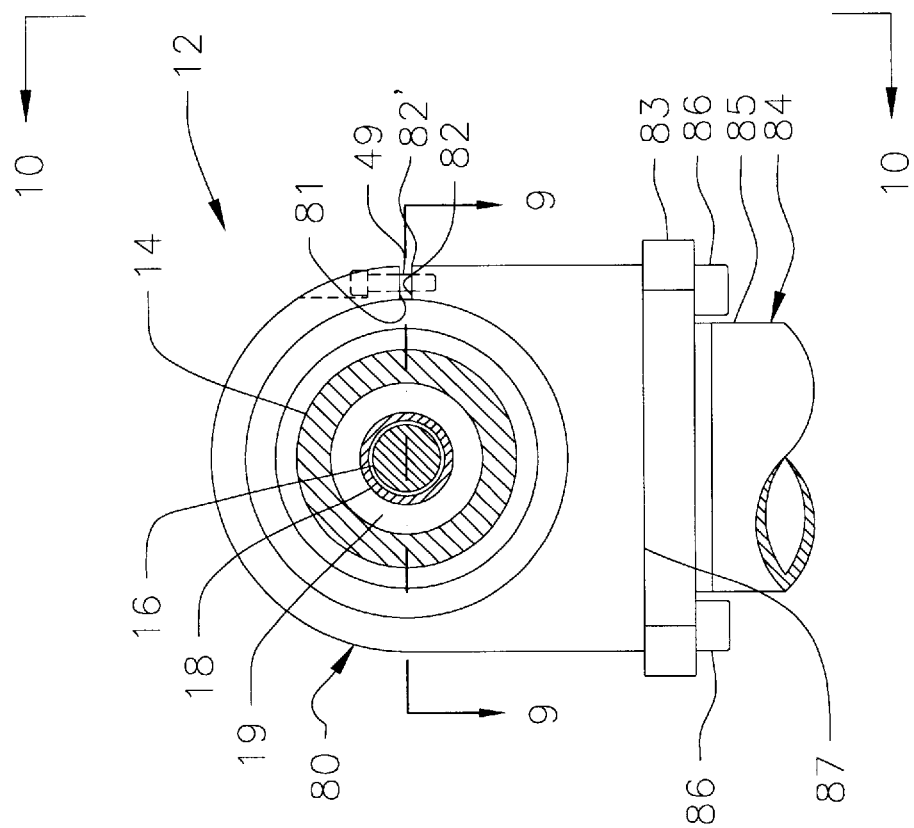
FIG. 8 is an elevational view of a rear support and looking from the front.

The housing 80 has it free end surfaces 81 (see FIG. 8) and 82, which are substantially parallel to each other, formed by a cutout 82'. The free end surfaces 81 and 82 are connected to each other by one of the bolts 49 as previously described with respect to the housing 20 (see FIG. 4). Tolerance adjustments are accomplished with two of the set screws 67 (see FIG. 10) in the same manner as previously described with respect to the housing 20 (see FIG. 4).

The housing 80 (see FIG. 8) is supported on a top plate 83 of a rear pedestal 84. The top plate 83 is connected to a column 85 of the rear pedestal 84 in the same manner as the top plate 29 (see FIG. 2) is attached to the column 31 of the front pedestal 30.

The housing 80 (see FIG. 8) is attached to the top plate 83 by a pair of bolts 86. The bolts 86 thread into tapped holes (not shown) in bottom surface 87 of the housing 80. The tapped holes are disposed at diagonal corners of the housing 80.

The top plate 83 has elongated slots 88 (see FIG. 11) in diagonal corners through which the bolts 86 pass prior to entering the tapped holes in the bottom surface 87 (see FIG. 8) of the housing 80. This enables fine adjustment in the same manner as previously described for the clamping arm 37 (see FIG. 5).

When the hydrodynamic bar feeder 10 (see FIG. 1) is installed, the cylindrical body 14 is arranged so that its longitudinal axis is aligned with the axis of the spindle of the lathe 17. When this position is determined, the pedestals 30 and 84 are fixed in position on the floor or other support surface. At this time, a set screw 89 (see FIG. 2) is moved against a substantially vertical surface 90 of the housing 20. The set screw 89 is fixed in this position.

When the housing 20 is moved from the solid line position of FIG. 12 to the phantom line position of FIG. 12, another of the bar stocks 16 (see FIG. 2) may be inserted within the feed tube 15 (see FIG. 1) within the cylindrical body 14 or the feed tube 15 may first be replaced with another of the feed tubes 15 of a different diameter. When the housing 20 is returned to the solid line position of FIG. 12, the substantially vertical surface 90 (see FIG. 2) of the housing 20 engages the fixed set screw 89 to insure that the axis of the cylindrical body 14 is aligned with the axis of the spindle of the lathe 17 (see FIG. 1).

As shown in FIG. 13, the first or inner element 50 swivels with respect to the second or outer element 56 when the cylindrical body 14 is moved to the phantom line position of FIG. 12; this is the maximum swivel movement. Of course, a similar arrangement exists between the first or inner element 50 (see FIG. 9) and the second or outer element 56 in the housing 80.

As shown in FIG. 12, the cylindrical body 14 has a stop collar 91 mounted thereon and engaging the housing 20 when the cylindrical body 14 has been advanced to its forwardmost position. When the stop collar 91 engages the housing 20, the stop collar 91 closes a limit switch 92, which is mounted on the clamping arm 37, to provide a signal to the lathe 17 (see FIG. 1) to indicate that the cylindrical body 14 is properly positioned for cooperation with the lathe 17 (see FIG. 1).

When the cylindrical body 14 (see FIG. 12) is moved away from the housing 20, the limit switch 92 opens to prevent movement of the lathe 17 (see FIG. 1). This is a safety feature to protect a user.

The cylindrical body 14 has a recuperator 93 (see FIG. 1) with a handle 94 on it. Gripping of the handle 94 enables motion of the cylindrical body 14.

It should be understood that the second element 56 (see FIG. 5) could be omitted. Without the second element 56, the passage 45 in each of the housings 20 and 80 (see FIG. 11) would have its wall formed with a spherical outer surface slightly larger than the spherical outer surface 52 (see FIG. 5) of the first element 50 as is the spherical outer surface 57 of the second element 56.

This also would require each of the housings 20 and 80 (see FIG. 11) to have a second cutout substantially diametrically opposite the cutout 46 (see FIG. 5) in the housing 20 and the cutout 82' (see FIG. 11) in the housing 80. These additional cutouts would be connected by one of the bolts 49 (see FIG. 4) and adjusted by the set screws 67 in the same manner as the cutouts 46 and 82' (see FIG. 11).

The clamping of the first element 50 (see FIG. 5) could be accomplished by forming the inner surface 75 of the clamping disk 72 as a spherical surface with substantially the same radius as the wall of the passage 45.

An advantage of this invention is that it reduces the problems of aligning a cylindrical body of a bar feeder with the axis of a spindle of a lathe. Another advantage of this invention is that it eliminates the need for any pivotal mounting of the rear support to enable movement of a cylindrical body to an access position. A further advantage of this invention is that a cylindrical body will always be returned to its alignment position with the axis of a spindle of a lathe. Still another advantage of this invention is that sliding of a cylindrical body enables much closer positioning of a bar stock with respect to a lathe.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A bar feeder support for supporting a cylindrical body supporting at least one feed tube in which a bar stock is to be supported for feeding to a lathe including:

first and second support means for supporting a cylindrical body
      at longitudinally spaced portions of the cylindrical body;
   each of said first support means and said second support means including:
      swivel means for supporting the cylindrical body for both sliding and swivel motion;
      and supporting means for supporting said swivel means;
   said first support means having clamping means for cooperating with said swivel means of said first support means for clamping a portion of the cylindrical body at a desired longitudinal position to prevent motion of the cylindrical body;
   and at least one of said swivel means of said first support means and said second support means having both sliding and swivel motions of the cylindrical body simultaneously when said clamping means is released to enable movement of said swivel means of said first support means relative to said supporting means for supporting said swivel means of said first support means.

2. A bar feeder support for supporting a cylindrical body supporting at least one feed tube in which a bar stock is to be supported for feeding to a lathe including:

first and second support means for supporting a cylindrical body at longitudinally spaced portions of the cylindrical body;
   each of said first support means and said second support means including:
      swivel means for supporting the cylindrical body for both sliding and swivel motion;
      and supporting means for supporting said swivel means;
   said first support means having clamping means for cooperating with said swivel means of said first support means for clamping a portion of the cylindrical body at a desired longitudinal position to prevent motion of the cylindrical body;
   said swivel means of each of said first support means and said second support means including:
      a first element having:
         an inner cylindrical surface through which the cylindrical body passes;
         and an outer spherical surface;
      and a second element having an inner spherical surface cooperating with said outer spherical surface of said first element of said swivel means to support said first element for swivel motion relative to said second element;
   said supporting means for supporting said swivel means of said first support means including supporting means for supporting said second element of said swivel means of said first support means;
   said clamping means including moving and holding means for moving said inner spherical surface of said second element into tight engagement with said outer spherical surface of said first element and holding said inner spherical surface of said second element in engagement with said outer spherical surface of said first element to clamp the cylindrical body at said first support means;
   and said supporting means for supporting said swivel means of said second support means including supporting means for supporting said second element of said swivel means of said second support means.

3. The bar feeder support according to claim 2 in which:
   said second element of said swivel means of each of said first support means and said second support means includes a cylindrical outer surface;
   and said supporting means of said first support means includes cooperating means for cooperating with said cylindrical outer surface of said second element of said swivel means of said first support means for supporting said swivel means of said first support means;
   and said supporting means of said second support means includes cooperating means for cooperating with said cylindrical outer surface of said second element of said swivel means of said second support means for supporting said swivel means of said second support means.

4. The bar feeder support according to claim 3 in which:
   said supporting means of said first support means includes a housing, said clamping means holding said housing stationary to retain the cylindrical body in its aligned position;
   said cooperating means of said supporting means of said first support means includes a cylindrical inner surface of said housing for cooperating with said cylindrical outer surface of said second element of said swivel means of said first support means for supporting said swivel means of said first support means;
   said supporting means of said second support means includes a fixed housing;
   and said cooperating means of said supporting means of said second support means includes a cylindrical inner surface of said fixed housing for cooperating with said cylindrical outer surface of said second element of said swivel means of said second support means for supporting said swivel means of said second support means.

5. The bar feeder support according to claim 4 in which said first support means includes:
   slidable mounting means for slidably mounting said housing of said supporting means of said first support means for movement between a position in which the cylindrical body is in its aligned position and an access position in which a bar stock may be loaded in the feed tube in the cylindrical body, the feed tube may be removed from the cylindrical body, and a feed tube may be loaded into the cylindrical body;

means for insuring that said housing returns to its position in which the cylindrical body is in its aligned position;

and said clamping means holding said housing in its position in which the cylindrical body is in its aligned position.

6. The bar feeder support according to claim 5 in which said slidable mounting means includes:

a fixed support;

slidable means having said housing fixed thereto and movable along said fixed support between an access position and an aligned position;

and said insuring means having means for cooperating with said housing on said slidable means to stop return of said housing from its access position at its aligned position.

7. The bar feeder support according to claim 6 in which said first element and said second element of each of said first support means and said second support means are non-continuous.

8. The bar feeder support according to claim 5 in which said first element and said second element of each of said first support means and said second support means are non-continuous.

9. The bar feeder support according to claim 4 in which said first element and said second element of each of said first support means and said second support means are non-continuous.

10. The bar feeder support according to claim 3 in which said first element and said second element of each of said first support means and said second support means are non-continuous.

11. The bar feeder support according to claim 2 in which said first element and said second element of each of said first support means and said second support means are non-continuous.

12. A bar feeder including:

a cylindrical body;

first and second support means for supporting said cylindrical body at longitudinally spaced portions of said cylindrical body;

at least one feed tube supported in said cylindrical body for supporting a bar stock for feeding to a lathe;

said first support means being closer to the end of said cylindrical body receiving said feed tube than said second support means;

each of said first support means and said second support means including:

swivel means for supporting said cylindrical body for both sliding and swivel motion;

and supporting means for supporting said swivel means;

said first support means having clamping means for cooperating with said swivel means of said first support means for clamping a portion of said cylindrical body at a desired longitudinal position to prevent motion of said cylindrical body;

and at least one of said swivel means of said first support means and said second support means having both sliding and swivel motions of said cylindrical body simultaneously when said clamping means is released to enable movement of said swivel means of said first support means relative to said supporting means for supporting said swivel means of said first support means.

13. A bar feeder including:

a cylindrical body;

first and second support means for supporting said cylindrical body at longitudinally spaced portions of said cylindrical body;

at least one feed tube supported in said cylindrical body for supporting a bar stock for feeding to a lathe;

said first support means being closer to the end of said cylindrical body receiving said feed tube than said second support means;

each of said first support means and said second support means including:

swivel means for supporting said cylindrical body for both sliding and swivel motion;

and supporting means for supporting said swivel means;

said first support means having clamping means for cooperating with said swivel means of said first support means for clamping a portion of said cylindrical body at a desired longitudinal position to prevent motion of said cylindrical body;

said swivel means of each of said first support means and said second support means including:

a first element having:

an inner cylindrical surface through which said cylindrical body passes;

and an outer spherical surface;

and a second element having an inner spherical surface cooperating with said outer spherical surface of said first element of said swivel means to support said first element for swivel motion relative to said second element;

said supporting means for supporting said swivel means of said first support means including supporting means for supporting said second element of said swivel means of said first support means;

said clamping means including moving and holding means for moving said inner spherical surface of said second element into tight engagement with said outer spherical surface of said first element and holding said inner spherical surface of said second element in engagement with said outer spherical surface of said first element to clamp said cylindrical body at said first support means;

and said supporting means for supporting said swivel means of said second support means including supporting means for supporting said second element of said swivel means of said second support means.

14. The bar feeder according to claim 13 in which:

said second element of said swivel means of each of said first support means and said second support means includes a cylindrical outer surface;

and said supporting means of said first support means includes cooperating means for cooperating with said cylindrical outer surface of said second element of said swivel means of said first support means for supporting said swivel means of said first support means;

and said supporting means of said second support means includes cooperating means for cooperating with said cylindrical outer surface of said second element of said swivel means of said second support means for supporting said swivel means of said second support means.

15. The bar feeder according to claim 14 in which:

said supporting means of said first support means includes a housing, said clamping means holding said housing stationary to retain said cylindrical body in its aligned position;

said cooperating means of said supporting means of said first support means includes a cylindrical inner surface of said housing for cooperating with said cylindrical outer surface of said second element of said swivel means of said first support means for supporting said swivel means of said first support means;

said supporting means of said second support means includes a fixed housing;

and said cooperating means of said supporting means of said second support means includes a cylindrical inner surface of said fixed housing for cooperating with said cylindrical outer surface of said second element of said swivel means of said second support means for supporting said swivel means of said second support means.

16. The bar feeder according to claim 15 in which said first support means includes:

slidable mounting means for slidably mounting said housing of said supporting means of said first support means for movement between an aligned position in which said cylindrical body is in its aligned position and an access position in which a bar stock may be loaded in said feed tube in said cylindrical body, said feed tube may be removed from said cylindrical body, and another of said feed tubes may be loaded into said cylindrical body;

means for insuring that said housing returns to its position in which said cylindrical body is in its aligned position;

and said clamping means holding said housing in its position in which said cylindrical body is in its aligned position.

17. The bar feeder according to claim 16 in which said slidable mounting means includes:

a fixed support;

slidable means having said housing fixed thereto and movable along said fixed support between an access position and an aligned position;

and said insuring means having means for cooperating with said housing on said slidable means to stop return of said housing from its access position at its aligned position.

18. The bar feeder according to claim 17 in which said first element and said second element of each of said first support means and said second support means are non-continuous.

19. The bar feeder according to claim 16 in which said first element and said second element of each of said first support means and said second support means are non-continuous.

20. The bar feeder according to claim 15 in which said first element and said second element of each of said first support means and said second support means are non-continuous.

21. A bar feeder support for supporting a cylindrical body supporting at least one feed tube in which a bar stock is to be supported for feeding to a lathe including:

first and second support means for supporting a cylindrical body at longitudinally spaced portions of the cylindrical body;

each of said first support means and said second support means including:

swivel means for supporting the cylindrical body for both sliding and swivel motion;

and supporting means for supporting said swivel means;

said first support means having clamping means for cooperating with said swivel means of said first support means for clamping a portion of the cylindrical body at a desired longitudinal position to prevent motion of the cylindrical body;

said first support means including:

a fixed support;

and sliding means slidably supported by said fixed support;

said clamping means being mounted on said fixed support;

said supporting means of said first support means including a housing fixed to said sliding means;

and said clamping means holding said housing stationary.

22. The bar feeder support according to claim 21 in which said clamping means includes:

a support fixed to said fixed support;

and movable means supported by said fixed support of said clamping means for movement into engagement with said swivel means of said first support means, said movable means holding said housing stationary.

23. A bar feeder including:

a cylindrical body;

first and second support means for supporting said cylindrical body at longitudinally spaced portions of said cylindrical body;

at least one feed tube supported in said cylindrical body for supporting a bar stock for feeding to a lathe;

said first support means being closer to the end of said cylindrical body receiving said feed tube than said second support means;

each of said first support means and said second support means including:

swivel means for supporting said cylindrical body for both sliding and swivel motion;

and supporting means for supporting said swivel means;

said first support means having clamping means for cooperating with said swivel means of said first support means for clamping a portion of said cylindrical body at a desired longitudinal position to prevent motion of said cylindrical body;

said first support means including:

a fixed support;

and sliding means slidably supported by said fixed support;

said clamping means being mounted on said fixed support;

said supporting means of said first support means including a housing fixed to said sliding means;

and said clamping means holding said housing stationary.

24. The bar feeder according to claim 23 in which said clamping means includes:

a support fixed to said fixed support;

and movable means supported by said fixed support of said clamping means for movement into engagement with said swivel means of said first support means, said movable means holding said housing stationary.

25. A bar feeder support for supporting a cylindrical body supporting at least one feed tube in which a bar stock is to be supported for feeding to a lathe including:

first and second support means for supporting a cylindrical body at longitudinally spaced portions of the cylindrical body;

each of said first support means and said second support means including:
  swivel means for supporting the cylindrical body for both sliding and swivel motion;
  and supporting means for supporting said swivel means;
said first support means having clamping means for cooperating with said swivel means of said first support means for clamping a portion of the cylindrical body at a desired longitudinal position to prevent motion of the cylindrical body;
and said first support means including:
  a fixed support;
  said supporting means being movably supported by said fixed support;
  said clamping means being supported by said fixed support;
  and said clamping means cooperating with said swivel means to hold said supporting means from movement relative to said fixed support.

26. The bar feeder support according to claim 25 in which said clamping means includes:
  first means supported by said fixed support and fixed thereto;
  and second means supported by said first means and movable relative thereto, said second means cooperating with said swivel means to hold said supporting means from movement relative to said fixed support.

27. A bar feeder including:
  a cylindrical body;
  first and second support means for supporting said cylindrical body at longitudinally spaced portions of said cylindrical body;
  at least one feed tube supported in said cylindrical body for supporting a bar stock for feeding to a lathe;
  said first support means being closer to the end of said cylindrical body receiving said feed tube than said second support means;
  each of said first support means and said second support means including:
    swivel means for supporting said cylindrical body for both sliding and swivel motion;
    and supporting means for supporting said swivel means;
  said first support means having clamping means for cooperating with said swivel means of said first support means for clamping a portion of said cylindrical body at a desired longitudinal position to prevent motion of said cylindrical body;
  and said first support means including:
    a fixed support;
    said supporting means being movably supported by said fixed support;
    said clamping means being supported by said fixed support;
    and said clamping means cooperating with said swivel means to hold said supporting means from movement relative to said fixed support.

28. The bar feeder according to claim 27 in which said clamping means includes:
  first means supported by said fixed support and fixed thereto;
  and second means supported by said first means and movable relative thereto, said second means cooperating with said swivel means to hold said supporting means from movement relative to said fixed support.

29. A bar feeder support for supporting a cylindrical body supporting at least one feed tube in which a bar stock is to be supported for feeding to a lathe including:
  first and second support means for supporting a cylindrical body at longitudinally spaced portions of the cylindrical body;
  each of said first support means and said second support means including:
    swivel means for supporting the cylindrical body for both sliding and swivel motion;
    and supporting means for supporting said swivel means;
  said first support means having clamping means for cooperating with said swivel means of said first support means for clamping a portion of the cylindrical body at a desired longitudinal position to prevent motion of the cylindrical body;
  and said first support means including:
    means for movably supporting said supporting means;
    and insuring means for insuring that said supporting means is movable only in a substantially straight line when said clamping means ceases to clamp.

30. A bar feeder including:
  a cylindrical body;
  first and second support means for supporting said cylindrical body at longitudinally spaced portions of said cylindrical body;
  at least one feed tube supported in said cylindrical body for supporting a bar stock for feeding to a lathe;
  said first support means being closer to the end of said cylindrical body receiving said feed tube than said second support means;
  each of said first support means and said second support means including:
    swivel means for supporting said cylindrical body for both sliding and swivel motion;
    and supporting means for supporting said swivel means;
  said first support means having clamping means for cooperating with said swivel means of said first support means for clamping a portion of said cylindrical body at a desired longitudinal position to prevent motion of said cylindrical body;
  and said first support means including:
    means for movably supporting said supporting means;
    and insuring means for insuring that said supporting means is movable only in a substantially straight line when said clamping means ceases to clamp.

* * * * *

UNITED STATES PATENT AND TRADEMARK OFFICE
CERTIFICATE OF CORRECTION

PATENT NO. : 5,863,018
DATED      : January 26, 1999
INVENTOR(S): Clifford W. Allen, III It is certified that error appears in the above-identified patent and that said Letters Patent is hereby corrected as shown below:

Column 2, line 29, "supporting for" should read -- for supporting --

Column 4, line 40, "0.005", difference" should read -- 0.005 difference --

Column 7, lines 21-24 should read as follows:
-- first and second support means for supporting a cylindrical body at longitudinally spaced portions of the cylindrical body; --

Signed and Sealed this

Twenty-second Day of June, 1999

Attest:

Q. TODD DICKINSON

*Attesting Officer*    *Acting Commissioner of Patents and Trademarks*